(12) United States Patent
Belaskie et al.

(10) Patent No.: US 10,473,816 B2
(45) Date of Patent: Nov. 12, 2019

(54) CALIBRATIONS FOR A WELL DRILLING APPARATUS

(71) Applicant: Schlumberger Technology Corporation, Sugar land, TX (US)

(72) Inventors: James P Belaskie, Missouri City, TX (US); Jonathan Dunlop, Cambridge (GB); Jose Luis Sanchez, Austin, TX (US); Richard John Harmer, Houston, TX (US); Maurice Ringer, Lamorlaye (FR); CuiLi Yang, Bellevue, WA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 283 days.

(21) Appl. No.: 14/763,811

(22) PCT Filed: Mar. 24, 2014

(86) PCT No.: PCT/US2014/031538
§ 371 (c)(1),
(2) Date: Aug. 2, 2015

(87) PCT Pub. No.: WO2014/160625
PCT Pub. Date: Oct. 2, 2014

(65) Prior Publication Data
US 2015/0362621 A1 Dec. 17, 2015

Related U.S. Application Data

(60) Provisional application No. 61/806,793, filed on Mar. 29, 2013.

(51) Int. Cl.
*G01V 13/00* (2006.01)
*E21B 47/022* (2012.01)
(Continued)

(52) U.S. Cl.
CPC .............. *G01V 13/00* (2013.01); *E21B 7/10* (2013.01); *E21B 47/0006* (2013.01); *E21B 47/022* (2013.01); *E21B 47/06* (2013.01)

(58) Field of Classification Search
None
See application file for complete search history.

(56) References Cited

U.S. PATENT DOCUMENTS 4,285,236 A 8/1981 Chien
6,662,110 B1 12/2003 Bargach et al.
(Continued)

OTHER PUBLICATIONS

EP Application No. 14773503.9 European Search Report, dated Oct. 11, 2016, 3 pgs.
(Continued)

*Primary Examiner* — James G Norman
(74) *Attorney, Agent, or Firm* — Alec J. McGinn

(57) ABSTRACT

A calibration quality associated with a well-drilling apparatus can be determined. A projected value and a calculated value based upon a data set corresponding to a time interval section of a rig state of the well-drilling apparatus can be determined. A difference can be calculated between the projected value and the calculated value. A quality indicator can be applied to the difference, and a calibration quality based upon the application of the quality indicator can be determined.

19 Claims, 8 Drawing Sheets

(51) Int. Cl.
*E21B 7/10* (2006.01)
*E21B 47/00* (2012.01)
*E21B 47/06* (2012.01)

(56) References Cited

U.S. PATENT DOCUMENTS

| | | |
|---|---|---|
| 7,128,167 B2 | 10/2006 | Dunlop et al. |
| 2004/0124009 A1* | 7/2004 | Hoteit .................... G06N 7/005 175/25 |
| 2011/0144809 A1 | 6/2011 | Boone |
| 2011/0155462 A1 | 6/2011 | Du et al. |
| 2012/0059521 A1 | 3/2012 | Iversen |
| 2012/0130693 A1 | 5/2012 | Ertas |

OTHER PUBLICATIONS

EP Application No. 14773503.9, Communication—Article 94(3) EPC, dated Oct. 27, 2016, 6 pgs.
First Office Action issued in related CN application 201480019320 dated Apr. 25, 2016, 19 pages.
International Preliminary Report on Patentability issued in related PCT application PCT/US2014/031538 dated Oct. 8, 2015, 10 pages.
International Search Report and Written Opinion issued on related PCT application PCT/US2014/031538 dated Jun. 26, 2014.
Office Action issued in related EP application 14773503.9 dated Nov. 5, 2015, 2 pages.
Communication pursuant to Article 94(3) EPC for the equivalent European patent application 14773503.9 dated Sep. 26, 2018.

\* cited by examiner

CALIBRATIONS FOR A WELL DRILLING APPARATUS

BACKGROUND

Oil wells are created by drilling a hole into the earth utilizing a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be utilized to cool the bit, lift rock cuttings to the surface, at least partially prevent destabilization of the rock in the wellbore, and/or at least partially overcome the pressure of fluids inside the rock so that the fluids do not enter the wellbore. During such drilling operations, a drilling apparatus can be calibrated to ensure effective operations.

SUMMARY

Aspects of the disclosure can relate to a computing device for determining a calibration quality associated with a well-drilling apparatus. The computing device may include a processor that executes modules to calculate a projected value and a calculated value based upon a data set corresponding to a time interval section of a rig state of a well-drilling apparatus. A difference can be calculated between the projected value and the calculated value. A quality indicator may be applied to the difference, and a calibration quality based upon the application of the quality indicator can be determined.

Other aspects of the disclosure can relate to a method for determining a calibration quality. The method may include calculating a projected value and a calculated value based upon a data set corresponding to a time interval section of a rig state of a well-drilling apparatus. A difference between the projected value and the calculated value can be calculated. A quality indicator can be applied to the difference between the projected value and the calculated value. A calibration quality based upon the application of the quality indicator may be determined.

Also, aspects of the disclosure can relate to a system for determining a calibration quality associated with a well-drilling apparatus. The system may include a well-drilling apparatus for drilling a wellbore. In some embodiments, the well-drilling apparatus includes a well logging tool for measuring characteristics associated with a section of the well-drilling apparatus. The system may also include a computing device in communication with the well logging tool. The computing device may include a processor that executes modules to calculate a projected value and a calculated value based upon a data set corresponding to a time interval section of a rig state of a well-drilling apparatus. A difference can be calculated between the projected value and the calculated value. A quality indicator may be applied to the difference, and a calibration quality based upon the application of the quality indicator can be determined.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The Detailed Description is described with reference to the accompanying figures. The use of the same reference numbers in different instances in the description and the figures may indicate similar or identical items.

DETAILED DESCRIPTION

Disclosed is a system that measures relevant data points during a connection and computes calibrations based upon the relevant data points. The system may also determine the quality of the computed calibrations, which may allow automated drilling procedures to continue independent of a driller's actions. In accordance with the present disclosure, a well site with associated wellbore and apparatus is described in order to describe an embodiment of the application. It is understood that an apparatus at the well site can be modified in accordance with the field considerations encountered.

Figure 1:
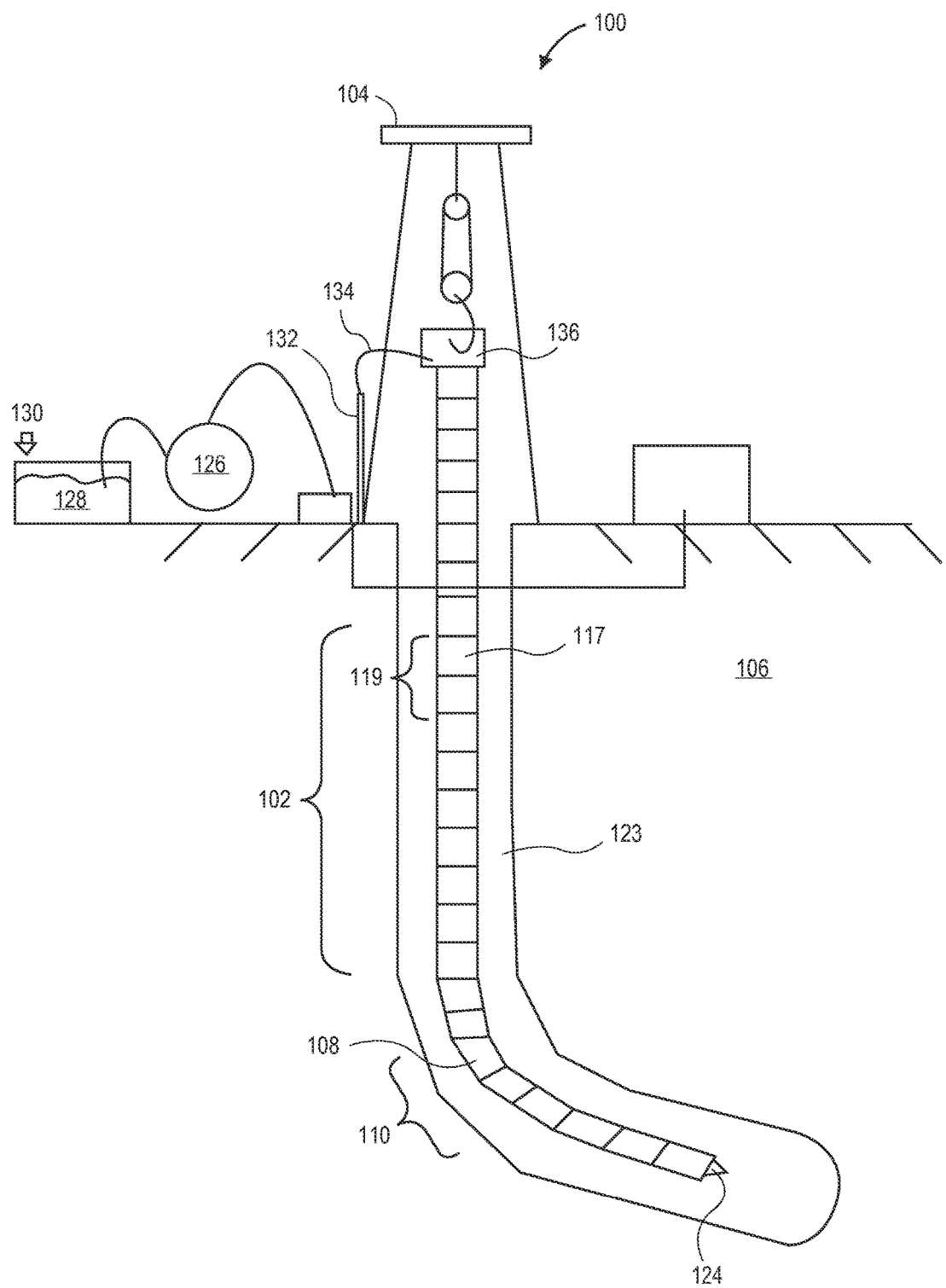
FIG. 1 is a diagrammatic illustration of a well-drilling apparatus in accordance with an example embodiment of the present disclosure.

FIG. 1 depicts a well-drilling apparatus 100 in accordance with one or more embodiments of the present disclosure. A drill string 102 can extend from a drill rig 104 into a zone of the formation of reservoir 106. The drill string 102 may employ a communication device 108 for transmitting data from downhole to the surface. In one or more embodiments of the present disclosure, the communication device 108 may comprise a mud pulse telemetry communication device, an electromagnetic communication device, an acoustic communication device, a wired drill pipe communication device, combinations thereof, or the like.

A bottom hole assembly ("BHA") may be suspended at an end of the drill string 102. In an embodiment, the bottom hole assembly includes one or more well logging tools 110 (e.g. logging tool and/or measurement tool). The well logging tools 110 may comprise sensors that are capable of measuring one or more characteristics of the subterranean formation and/or the reservoir 106 and/or one or more characteristics associated with a section of the well-drilling apparatus. For example, the well logging tools 110 can include a measurement while drilling ("MWD") tool, a logging while drilling ("LWD") tool, a formation pressure while drilling ("FPWD") tool, a formation evaluation tool, a formation sampling tool, combinations thereof, or the like.

Logging while drilling tools used at the end of the drill string 102 can include a thick walled housing, commonly referred to as a drill collar, and can include one or more of a number of logging devices. The logging while drilling tool can be capable of measuring, processing, and/or storing information therein, as well as communicating with equipment disposed at the surface of the well site.

Measurement while drilling tools can include one or more of the following measuring tools: a modulator, a weight on bit measuring device, a torque measuring device, a vibration measuring device, a shock measuring device, a stick-slip measuring device, a direction measuring device, and inclination measuring device, and/or any other device capable of measuring relevant data points.

Measurements obtained by the bottom hole assembly or other tools and sensors coupled to the drill string 102 can be transmitted to a computing device 114 for analysis. For example, mud pulses can be used to transmit formation measurements performed by one or more of the well logging tools 110 to the computing device 114.

Figure 2:
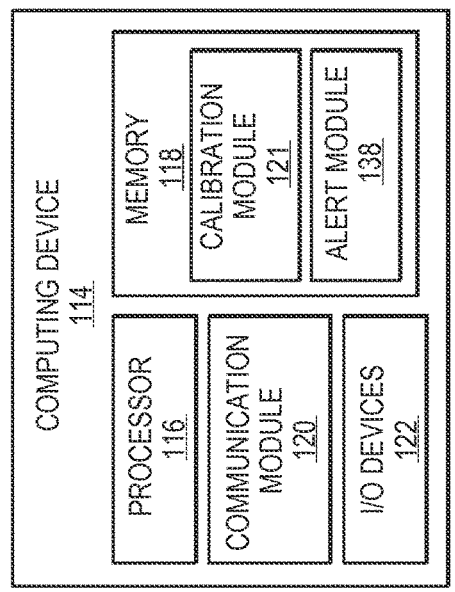
FIG. 2 is a diagrammatic illustration of a block diagram of a computing device in accordance with an example embodiment of the present disclosure.

A computing device 114 may be communicatively connected with the well-drilling apparatus 100. In one or more embodiments, the computing device 114 may comprise a server computing device, a desktop computing device, a laptop computing device, a mobile computing device (e.g., a smartphone, a tablet computing device, etc.), or the like. As shown in FIG. 2, the computing device 114 includes a processor 116, a memory 118, and a communication module 120. As discussed in greater detail herein, the computing device 114 receives data representing measurements from the well-drilling apparatus 100 (e.g., receive data from the well logging tools 110) and to predict the calibration for current and future stands 119 (e.g., two or three single joints of the drill pipe 117) of the well-drilling apparatus 100.

The processor 116 provides processing functionality for the computing device 114 and may include any number of processors, micro-controllers, or other processing systems, and resident or external memory for storing data and other information accessed or generated by the computing device 114. The processor 116 may execute one or more software programs which implement techniques described herein. The processor 116 is not limited by the materials from which it is formed or the processing mechanisms employed therein and, as such, may be implemented via semiconductor(s) and/or transistors (e.g., electronic integrated circuits (ICs)), and so forth.

The memory 118 is an example of tangible computer-readable media that provides storage functionality to store various data associated with the operation of the computing device 114, such as the software program and code segments mentioned above, or other data to instruct the processor 116 and other elements of the computing device 114 to perform the functionality described herein. Although a single memory 118 is shown, a wide variety of types and combinations of memory may be employed. The memory 118 may be integral with the processor 116, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The communication module 120 provides functionality to enable the computing device 114 to communicate with one or more networks. In various implementations, the communication module 120 may be representative of a variety of communication components and functionality including, but not limited to: one or more antennas; a browser; a transmitter and/or receiver (e.g., radio frequency circuitry); a wireless radio; data ports; software interfaces and drivers; networking interfaces; data processing components; and so forth.

The computing device 114 may further include one or more input/output (I/O) devices 122 (e.g., a keypad, buttons, a wireless input device, a thumbwheel input device, a trackstick input device, and so on). The I/O devices 122 may include one or more audio I/O devices, such as a microphone, speakers, and so on. Thus, I/O devices 122 may include a keyboard for receiving user input. In an implementation, the keyboard may be integrated with the computing device 114, or the keyboard may be a peripheral device that interfaces with the computing device 114 (e.g., via a USB port, etc.).

As shown in FIG. 2, the computing device 114 includes a calibration module 121 that is stored in the memory 118 and executable by the processor 116. The calibration module 121 represents functionality, which is described in greater detail herein, to predict calibration for current and future sections of the well-drilling apparatus 100 that may allow drilling operations to continue when insufficient off bottom measurements are obtained.

Referring back to FIG. 1, the drill rig 104 can be used to move the drill string 102 within the well that is being drilled through subterranean formations of the reservoir 106. The drill string 102 can be extended into the subterranean formations with a number of coupled drill pipes 117 of the drill string 102. Several of the components disposed proximate to the drill rig 104 can be used to operate components of the well-drilling apparatus 100. These components are explained with respect to their respective uses in drilling a well 123 for a better understanding thereof. The drill string 102 can be used to turn and transition a drill bit 124 into the bottom the well 123 to increase the length (depth) of the well 123. During drilling of the well 123, a pump 126 displaces drilling fluid (mud) 128 from a tank 130 (or pits) and displaces the mud 128 under pressure through a standpipe 132 and flexible conduit 134, such as a hose, through a top drive 136 and into an interior passage disposed within the drill string 102. The mud 128, which can be water or oil-based, exits the drill string 102 through courses or nozzles (not shown) in the drill bit 124, and the mud cools and lubricates the drill bit 124 and lifts drill cuttings generated by the drill bit 124 to the surface of the Earth through an annular arrangement.

When the well 123 has been drilled to a selected depth, the well logging tools 110 can be positioned at the lower end of the drill string 102, if not previously installed. The well logging tools 110 can be positioned downhole by pumping the well logging tools 110 down the drill string 102 or otherwise moving the well logging tools 110 down the drill string 102 while the drill string 102 is within the well 123.

During well logging operations, the pump 126 can be operated to disperse fluid to operate one or more turbines in the well logging tools 110 to provide power to operate certain devices in the well logging tools 110. It is understood that power can be provided to the well logging tools 110 in other ways. For example, batteries can be used to provide power to the well logging tools 110. In one embodiment, the batteries can be rechargeable batteries and can be recharged by turbines during fluid flow. The batteries can be positioned within the housing of one or more of the well logging tools 110. Other configurations of powering the well logging tools 110 can be used including, but not limited to, one-time power-use batteries.

As described above, the calibration module 121 provides functionality to predict a calibration value for current and future stands. The predicted calibration value may allow drilling operations to continue when insufficient off bottom measurements are acquired. For example, the computing device 114 receives measurement data from the well-drilling apparatus 100 during a connection and calculates a calibration value based upon the received measurement data.

The calibration module 121 provides functionality to determine sections of common rig states (e.g., rig state groupings) for each computation type. A rig state refers to intentional actions taking place in the drilling system (or systems) 100 during the drilling process. A rig state of a drilling system may be detected in accordance with the process set forth in U.S. Pat. No. 7,128,167, entitled SYSTEM AND METHOD FOR RIG STATE DETECTION, which is hereby incorporated herein by reference.

In one or more embodiments, the calibration module 121 utilizes the data associated with a rig state to calculate the calibration value. The rig state data may concatenate data of like rig states prior to calculation. For example, a first set of data associated with a connection (e.g., a union or joint that connects two tubular components associated with the drill string 102) of the well-drilling apparatus 100, a second set of data associated with a connection of the well-drilling apparatus 100, and a third set of data associated with a connection of the well-drilling apparatus 100 may be furnished to the computing device 114. In this example, the calibration module 121 provides functionality to concatenate the first set of data, the second set of data, and the third set of data into a concatenated set of data associated with the connection(s). In another embodiment, the calibration module 121 can utilize a data set associated with the last valid section associated with the connection. A section may be defined as a time interval of the same rig state. In yet another embodiment, the calibration module 121 utilizes a data set associated with a longest section (e.g., section having the most contiguous data points measured during a connection).

Figure 3:
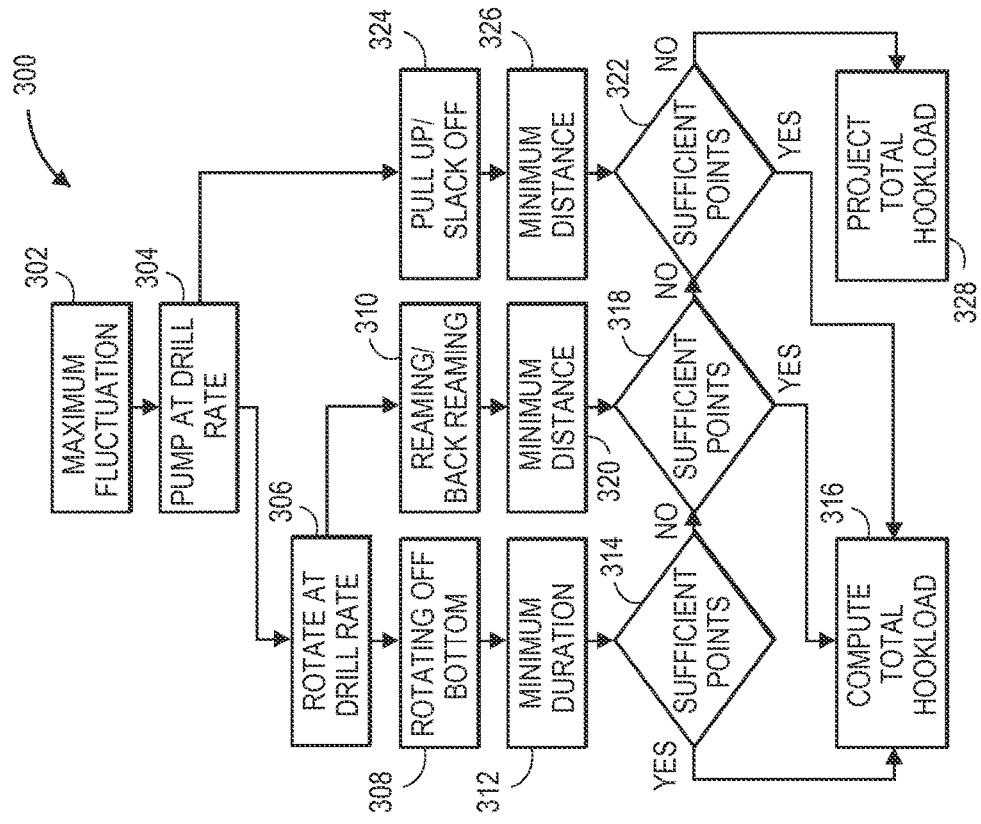
FIG. 3 is a flow diagram illustrating an example method of calculating a computed total hookload value and a projected hookload value in accordance with an example embodiment of the present disclosure.

FIG. 3 illustrates an example flow chart 300 for calculating a hookload value. The hookload value may comprise a value representing an amount of force exposed on a hook below the assembly of pulleys/sheaves. The hook is used to lift objects, such as drill pipes 117, during installation of such units during drilling activities extending the wellbore. A given connection may have a combination of rotating off bottom sections, reaming/back reaming sections, and pull up/slack off sections. The modules 119 utilize a data set for the respective connection to determine (e.g., calculate) the hookload value. As described below, the calibration module 121 causes the processor 116 to filter the data set utilizing one or more predefined values (e.g., criteria, thresholds, etc.). The calibration module 121 may utilize the filtered data set to cause the processor 116 to compute a hookload value if there is a sufficient data subset remaining after filtering or cause the processor 106 to project (e.g., estimate) the total hookload value if there is not a sufficient data subset. As shown in FIG. 3, the data within the data set is filtered based upon a maximum fluctuation value (Block 302) and a pump at drill rate value (Block 304). The processor 116 filters the data set based upon a maximum fluctuation value and a pump at drill rate value. As shown in FIG. 3, the data set may also be filtered based upon a rotate at drill rate value (Block 306). The data set is filtered based upon a rotating off bottom value (Block 308) or a reaming/back reaming value (Block 310). In one or more embodiments, the rotating off bottom value and the reaming/back reaming value comprise rig state specific values. Thus, the processor 116 filters the data set based upon a rotating off bottom value or a reaming/back reaming value. When the data set is filtered based upon the rotating off bottom value, the data set is filtered based upon a minimum duration value (Block 312). For example, the processor 116 filters the data set based upon a minimum duration value. After the filtering is applied, a determination is made of whether a sufficient number of data points remain in the data set for calculation purposes (Decision Block 314). The calibration module 121 instructs the processor 116 to determine whether a sufficient number of data points remain in the data set for calculation purposes. If a sufficient number of data points remain in the data set (YES from Decision Block 314), the remaining data points (e.g., data based upon the rotate at drill rate sections, data based upon the rotating off bottom sections) are utilized to calculate the total hookload (Block 316). For instance, the calibration module 121 instructs the processor 116 to calculate a computed total hookload value based upon the filtered data set. In some embodiments, a determination as to whether a sufficient number of data points remain in the data set is made based upon a standard deviation of the remaining data points. For example, a quality indicator is determined based, at least in part, upon a standard deviation.

If there are not a sufficient number of data points in the data set after filtering (NO from Decision Block 314), a determination of whether there are a sufficient number of data points remaining in the data set based upon a reaming/back reaming value and a minimum distance value (Decision Block 318). The data set is filtered based upon the reaming/back reaming value (Block 306) and then filtered based upon a minimum distance value (Block 320). For example, the processor 116 is instructed to filter the data set based upon a reaming/back reaming value and a minimum distance value. After the filtering is applied, a determination of whether a sufficient number of data points remain in the data set for calculation purposes is made (Decision Block 318). If a sufficient number of data points remain in the data set (YES from Decision Block 318), the remaining data points (e.g., data based upon the rotate at drill rate sections, data based upon the reaming/back reaming sections) utilized to calculate the total hookload (Block 316). For example, the processor 116 calculates a total hookload value (e.g., computed total hookload value) utilizing the data set filtered utilizing a reaming/back reaming value and a minimum distance value.

If there are not a sufficient number of data points in the data set after filtering (NO from Decision Block 318), a determination of whether there are a sufficient number of data points remaining in the data set after filtering based upon a pull up/slack off value and minimum duration value (Decision Block 322). As described above, the processor 116 filters the data based upon a pump at drill rate value. The data set is filtered based upon a pull up/slack off value (Block 324). For example, the calibration module 121 causes the processor 116 to filter the data set based upon a pull up/slack off value (e.g., data based upon pull up/slack off section). The data set is then filtered based upon a minimum distance value (Block 326). The calibration module 121 instructs the processor 116 to filter the data set based upon the pull up/slack off value and a minimum distance value. After the data set is filtered, a determination of whether a sufficient number of data points remain in the data set for calculation purposes (Decision Block 322). If a sufficient number of data points remain in the data set (YES from Decision Block 322), the remaining data points (e.g., data filtered based upon the pump at drill rate value, data filtered based upon the pull up/slack off values) are utilized to calculate the total hookload (Block 316). If there are not a sufficient number of data points in the data set after filtering (NO from Decision Block 322), a projected total hookload value is calculated (Block 328). For example, the calibration module 121 instructs the processor 116 to calculate a projected (e.g., estimated) total hookload value based upon data set filtered utilizing the pull up/slack off value.

Figure 4:
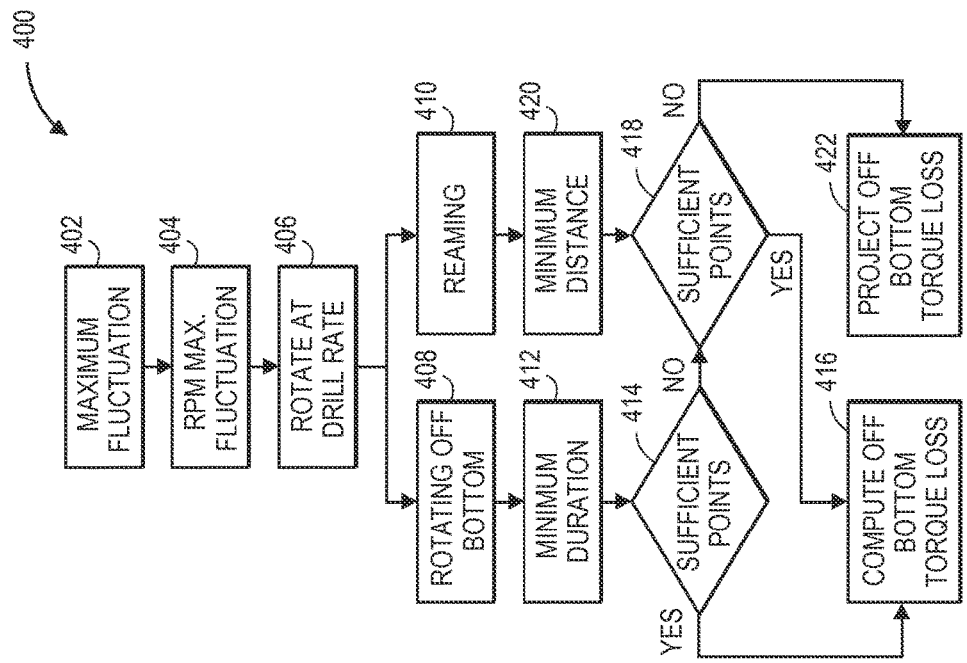
FIG. 4 is a flow diagram illustrating an example method of calculating a computed torque loss value and a projected torque loss value in accordance with an example embodiment of the present disclosure.

FIG. 4 illustrates an example flow chart 400 for calculating a torque loss value associated with the well-drilling apparatus 100. Torque values may represent values that the drill string 102 is exhibiting during rotary operation in the wellbore. A given connection may have a combination of rotating off bottom sections and reaming sections. The modules 119 utilize a data set for the respective connection to calculate the torque loss value. As described below, the calibration module 121 causes the processor 116 to filter the data set utilizing one or more predefined values (e.g., criteria, thresholds, etc.). For example, the data set associated with a section may be filtered based upon fluctuation, rotations per minute (RPM) fluctuation, and rotation close to drill rates. The calibration module 121 may utilize the filtered data set to cause the processor 116 to compute a torque loss value if there is a sufficient data subset remaining after filtering or cause the processor 106 to project (e.g., estimate) the torque loss value if there is not a sufficient data subset. As shown in FIG. 4, the data within the data set is filtered based upon a maximum fluctuation value (Block 402) and a RPM maximum fluctuation value (Block 404). For example, the processor 116 filters the data set based upon a maximum fluctuation value and a RPM maximum fluctuation value. As shown in FIG. 4, the data set may also be filtered based upon a rotate at drill rate value (Block 406). The data set is filtered based upon a rotating off bottom value (Block 408) or a reaming value (Block 410). In one or more embodiments, the rotating off bottom value and the reaming value comprise rig state specific values (e.g., rig state filters). The processor 116 filters the data set based upon a rotating off bottom value or a reaming value. When the data set is filtered based upon the rotating off bottom value, the data set is then filtered based upon a minimum duration value (Block 412). After the filtering is applied, a determination is made of whether a sufficient number of data points remain in the data set for calculation purposes (Decision Block 414). The calibration module 121 instructs the processor 116 to determine whether a sufficient number of data points remain in the data set for calculation purposes. If a sufficient number of data points remain in the data set (YES from Decision Block 414), the remaining data points (e.g., data based upon the rotate at drill rate sections, data based upon the rotating off bottom sections) are utilized to calculate an off bottom torque loss value (Block 416). For instance, the calibration module 121 instructs the processor 116 to calculate a computed off bottom torque loss value based upon the filtered dataset.

If there are not a sufficient number of data points in the data set after filtering (NO from Decision Block 414), a determination of whether there are a sufficient number of data points remaining the data set is based upon a reaming value and a minimum distance value (Decision Block 418).

As described above, the data set can be filtered based upon the reaming value (Block 406). The data set can then be filtered based upon a minimum distance value (Block 420). For example, the processor 116 is instructed to filter the data set based upon a reaming value and then a minimum distance value. After the filtering is applied, a determination of whether a sufficient number of data points remain in the data set for calculation purposes is made (Decision Block 418). If a sufficient number of data points remain in the data set (YES from Decision Block 418), the remaining data points (e.g., data based upon the rotate at drill rate sections, data based upon the reaming) are utilized to calculate the off bottom torque loss (Block 416). For example, the processor 116 calculates the off bottom torque loss value utilizing the data set filtered utilizing a reaming/back reaming value and a minimum distance value. If there are not a sufficient number of data points in the data set after filtering (NO from Decision Block 418), a projected off bottom torque loss value is calculated (Block 422). For example, the calibration module 121 instructs the processor 116 to calculate a projected (e.g., estimated) off bottom torque loss value using the data associated with the data set filtered using the reaming values.

Figure 5:
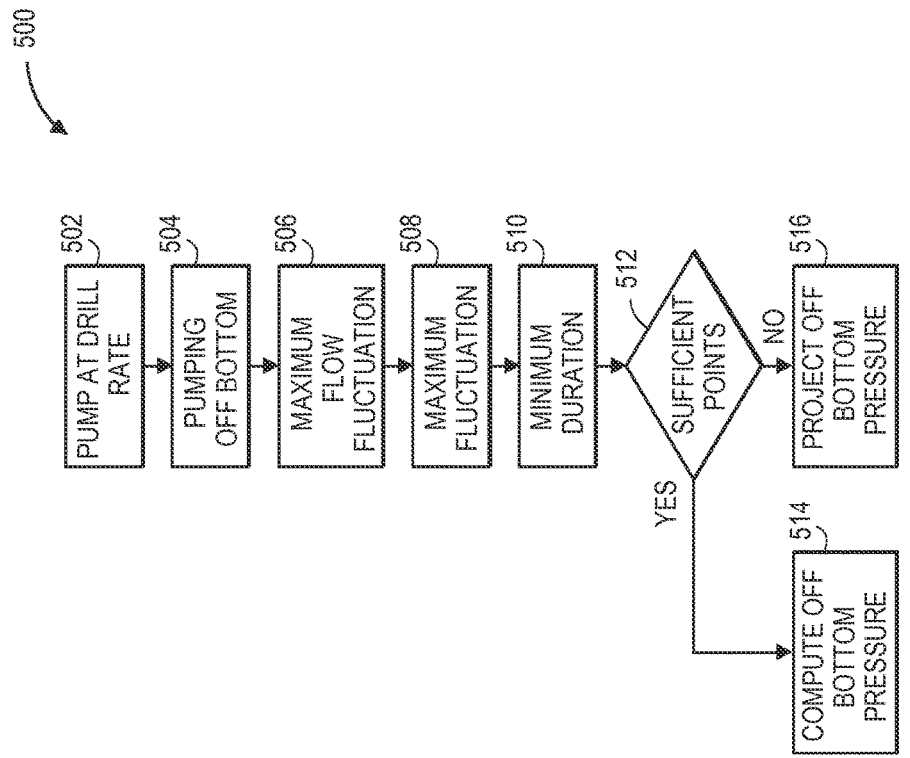
FIG. 5 is a flow diagram illustrating an example method of calculating a computed off bottom pressure value and a projected off bottom pressure value in accordance with an example embodiment of the present disclosure.

FIG. 5 illustrates an example flow chart 500 for calculating an off bottom pressure value associated with the well-drilling apparatus 100. A given connection may have a number of pumping sections that furnish data (e.g., tools 110 measure data associated with the pumping sections) for calculating an off bottom pressure value. The calibration module 121 utilize a data set for the respective connection to calculate the off bottom pressure value. As described below, the calibration module 121 causes the processor 116 to filter the data set utilizing one or more predefined values (e.g., criteria, thresholds, etc.). For example, the data set associated with a section may be filtered based upon fluctuation, flow fluctuation, and/or pumping close to drill rates. The calibration module 121 may utilize the filtered data set to cause the processor 116 to calculate an off bottom pressure value if there is a sufficient data set remaining after filtering, or cause the processor 106 to project (e.g., estimate) the off bottom pressure value if there is not a sufficient filtered data set. As shown in FIG. 5, the data within the data set is filtered based upon a pump at drill rate (Block 502). For example, the processor 116 filters the data set based upon a pump at drill rate. As shown in FIG. 5, the data set may also be filtered based upon a pumping off bottom value (Block 504), a maximum flow fluctuation value (Block 506), a maximum fluctuation value (Block 508), and a minimum duration value (Block 510). In one or more embodiments, the pumping off bottom value comprises a rig state specific value (e.g., a rig state filter). For instance, the calibration module 121 instructs the processor 116 to filter the data set based upon a pumping off bottom value, a maximum flow fluctuation value, a maximum fluctuation value, and a minimum duration value. After the filtering is applied, a determination is made of whether a sufficient number of data points remain in the data set for calculation purposes (Decision Block 512). For example, the calibration module 121 instructs the processor 116 to determine whether a sufficient number of data points remain in the data set for calculation purposes. If a sufficient number of data points remain in the data set (YES from Decision Block 512), the remaining data points (e.g., data based upon the rotate at drill rate sections, data based upon the rotating off bottom sections) are utilized to calculate an off bottom pressure value (Block 514). If there are not a sufficient number of data points in the data set after filtering (NO from Decision Block 512), a projected off bottom pressure value is calculated (Block 516). For example, the calibration module 121 instructs the processor 116 to calculate a projected (e.g., estimated) off bottom torque loss value based upon previous, valid calculations of off bottom pressure.

As described above, one or more filters may be utilized by the computing device 114 to calculate the total hookload value, an off bottom torque loss value, and/or an off bottom pressure value. The filters may be applied sequentially as data is acquired from the well-drilling apparatus 100. Table 1 includes a non-exhaustive listing of filters that may be utilized to calculate the respective values. It is contemplated that the below referenced filters may be modified according to the design of the well-drilling apparatus 100. For example, some filters may be utilized based upon the design of the well-drilling apparatus 100, while other filters are not utilized based upon the well-drilling apparatus 100.

TABLE 1

| | |
|---|---|
| RPMFilt | Fraction of Drilling RPM |
| SppaFilt | Fraction of Drilling Stand Pipe Pressure (Sppa) |
| OffBotFilt | Distance Off Bottom |
| FlowFilt | Fraction of Drilling Flowrate |
| FluxFilt | Maximum Fluctuation |
| FlowFluxFilt | Maximum Flow Fluctuation |
| RPMFluxFilt | Maximum RPM Fluctuation |
| RPMLowerLimit | Minimum RPM |
| FootageCriteria | Minimum Distance (for sliding and reaming |

Table 2 illustrates an example of which calculation processes described above can utilize the respective filters.

TABLE 2

| | Torque Loss | Total hookload | Off bottom pressure |
|---|---|---|---|
| SppaFract | X | X | |
| RpmFract | X | X | |
| MinFootage | X | X | |
| MinPoints | X | X | X |
| FluxFract | X | X | X |
| RpmFluxFract | X | | |
| FlowFract | | | X |
| FlowFluxFract | | | X |

Figure 6:
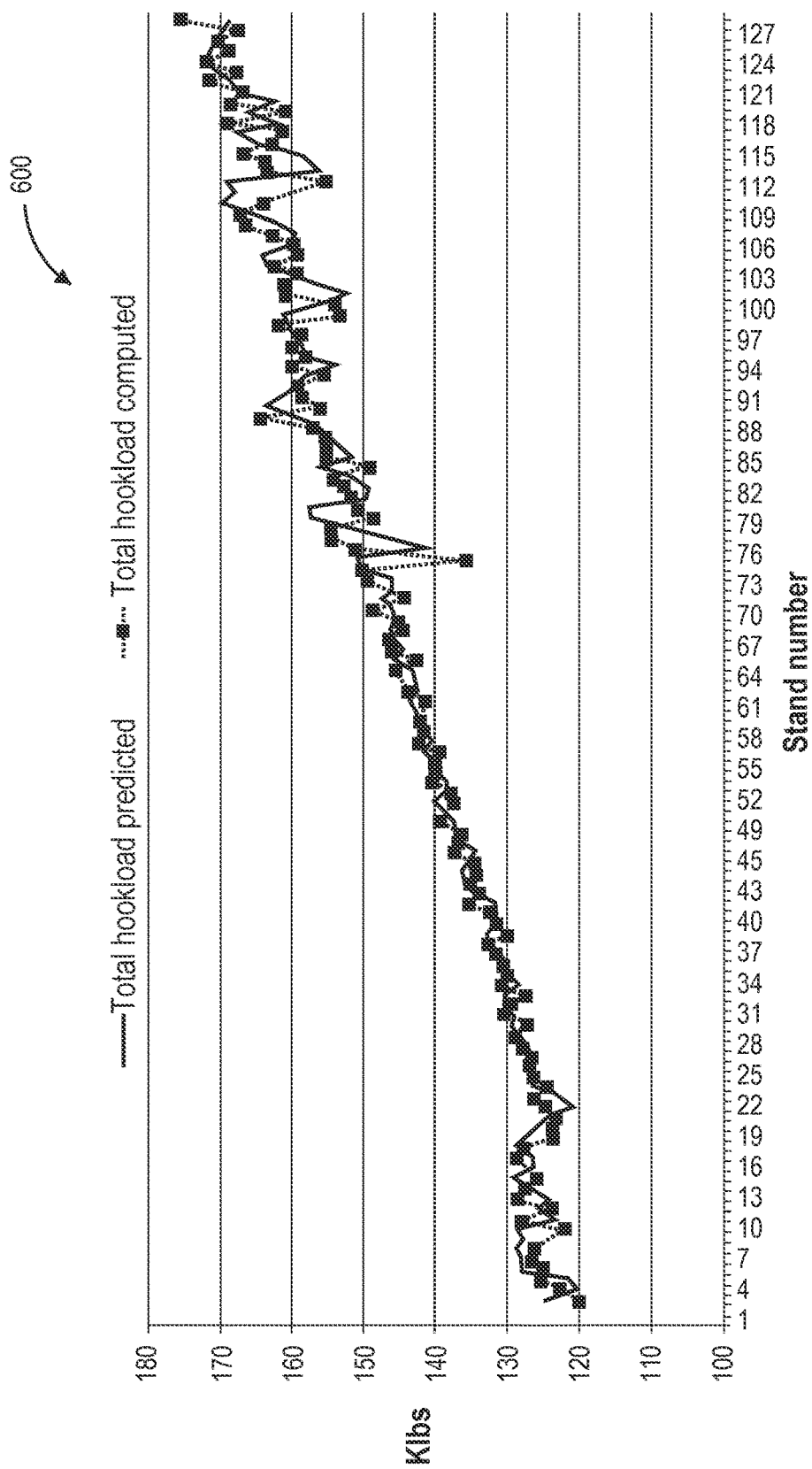
FIG. 6 is a graph depicting a projected hookload value and a computed hookload value in accordance with an example embodiment of the present disclosure.
Figure 7:
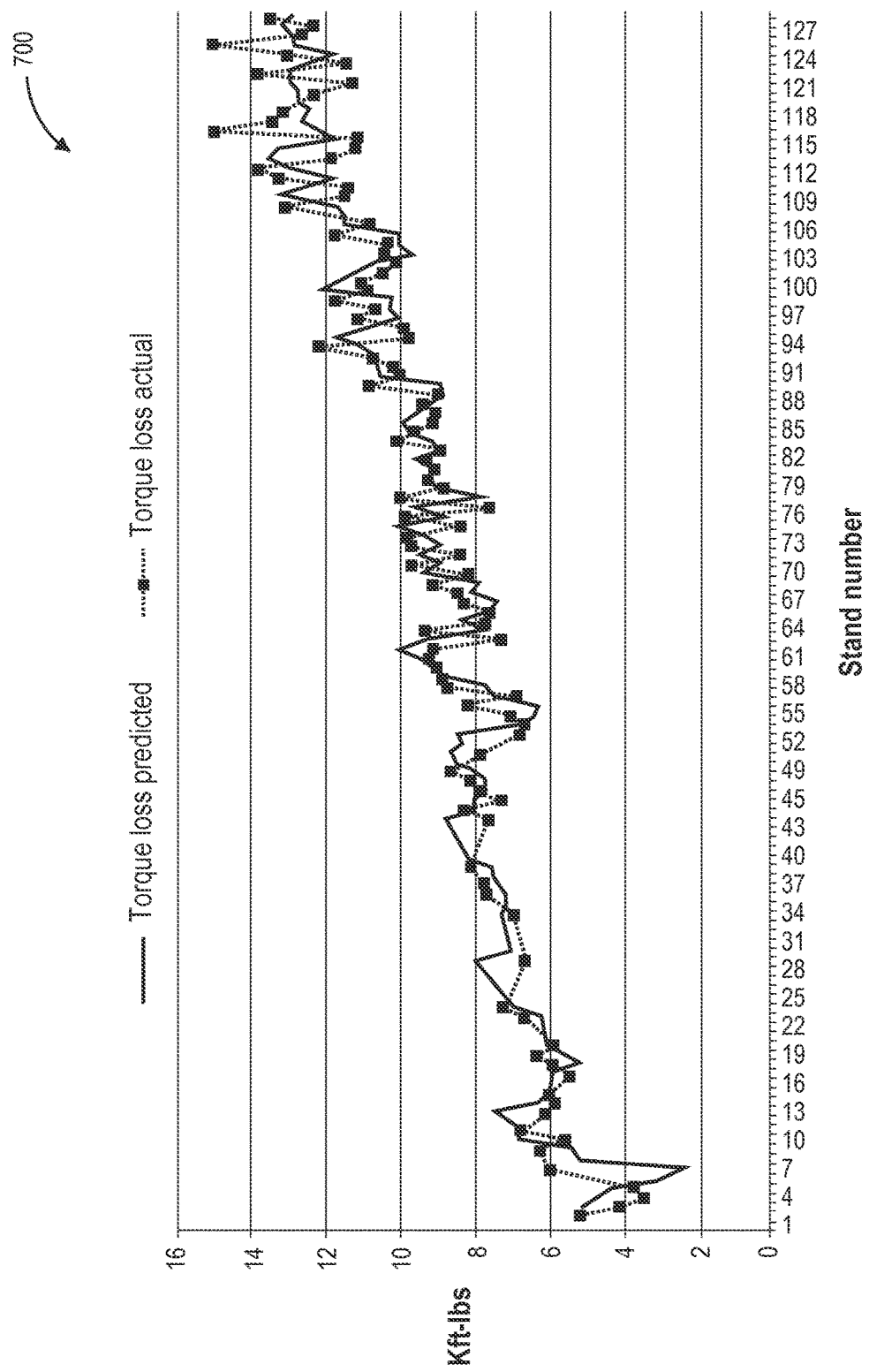
FIG. 7 is a graph depicting a projected torque loss value and a computed torque loss value in accordance with an example embodiment of the present disclosure.

The projected values described above (e.g., projected total hookload value, projected off bottom torque loss value, projected off bottom pressure value) and/or computed values (e.g., computed total hookload value, computed off bottom torque loss value, computed off bottom pressure value) may be utilized in a number of applications for the well-drilling apparatus 100. For example, the projected values and/or computed values may be utilized to calibrate one or more components of the well-drilling apparatus 100 during operation. In another example, the projected values may be used to replace computed values in the absence of one or more measured values. In yet another example, the projected values can be compared to the computed values to determine a quality of the projected value. The computing device 114 may utilize one or more suitable predictive models (e.g., processes, methods) to calculate a respective projected value (described above). These predictive models may include, but are not limited to: an average predictive process, a straight line predictive process, and/or a Kalman filter predictive process. FIG. 6 depicts an illustrative graph 600 representing a projected hookload value and a computed hookload value for various stands (e.g., stands 119) in accordance with the process 300 described above, and FIG. 7 depicts an illustrative graph 700 representing a projected torque loss value and a computed torque loss value for various stands (e.g., stands 119) in accordance with the process 400 described above.

The computing device 114 may compare the projected values with the computed values to determine calibration quality. For example, the computing device 114 compares a projected hookload value with a computed hookload value to determine a calibration quality. In another example, the computing device 114 may compare a projected off bottom torque loss value with a computed off bottom torque loss value to determine a calibration quality. In yet another example, the computing device 114 may compare a projected off bottom pressure value with a computed off bottom pressure value to determine a calibration quality.

Figure 8:
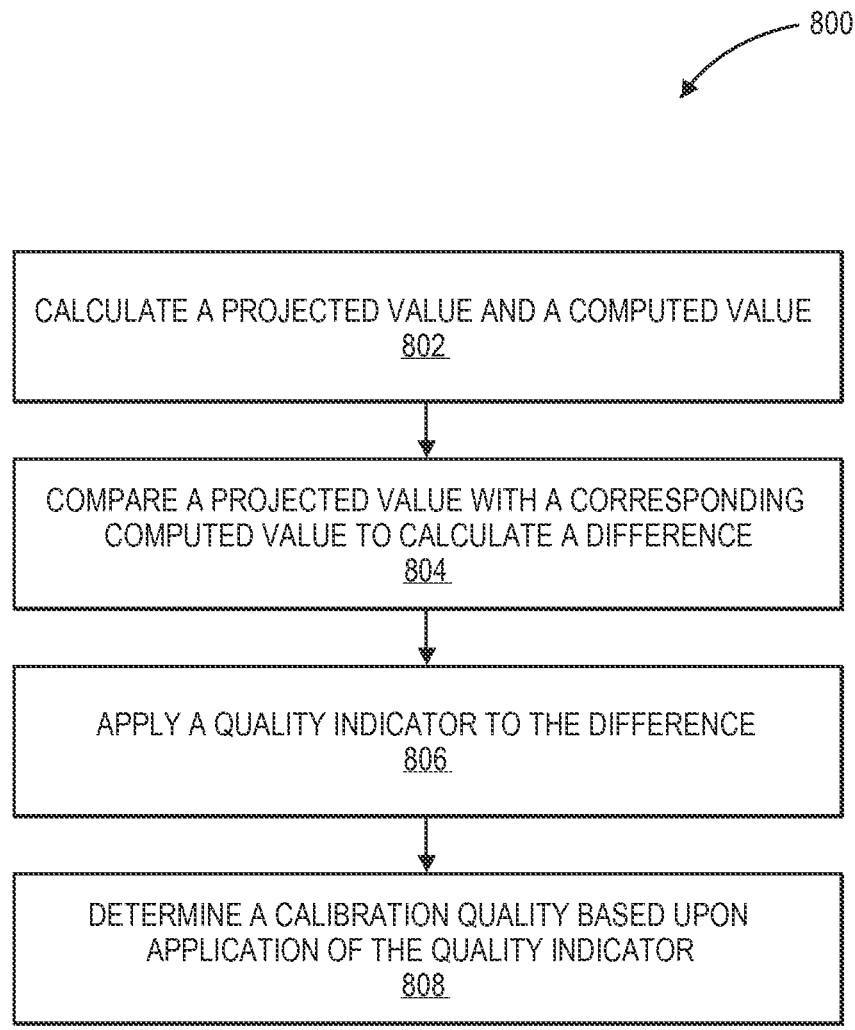
FIG. 8 is a flow diagram illustrating an example method of determining a calibration quality value in accordance with an example embodiment of the present disclosure.

FIG. 8 illustrates a method 800 for determining a calibration quality value in accordance with example embodiment of the present disclosure. As shown, a projected value and a computed value are calculated (Block 802). As described above with respect to FIGS. 3 through 5, respective projected values and computed values are calculated by the processor 116. For example, the projected values and the computed values are calculated based upon a data set corresponding to a section associated with the well-drilling apparatus. A respective projected value is compared with a corresponding computed value (Block 804). The processor 116 compares a projected value (e.g., projected hookload value, projected off bottom torque loss value, projected off bottom pressure value) is compared with a corresponding computed value (e.g., computed hookload value, computed off bottom torque loss value, computed off bottom pressure value) to determine a difference between the values. For example, the processor 116 determines a difference between a projected value associated with a first stand of the well-drilling apparatus 100 and a computed value associated with the first stand of the well-drilling apparatus 100.

Figure 9:
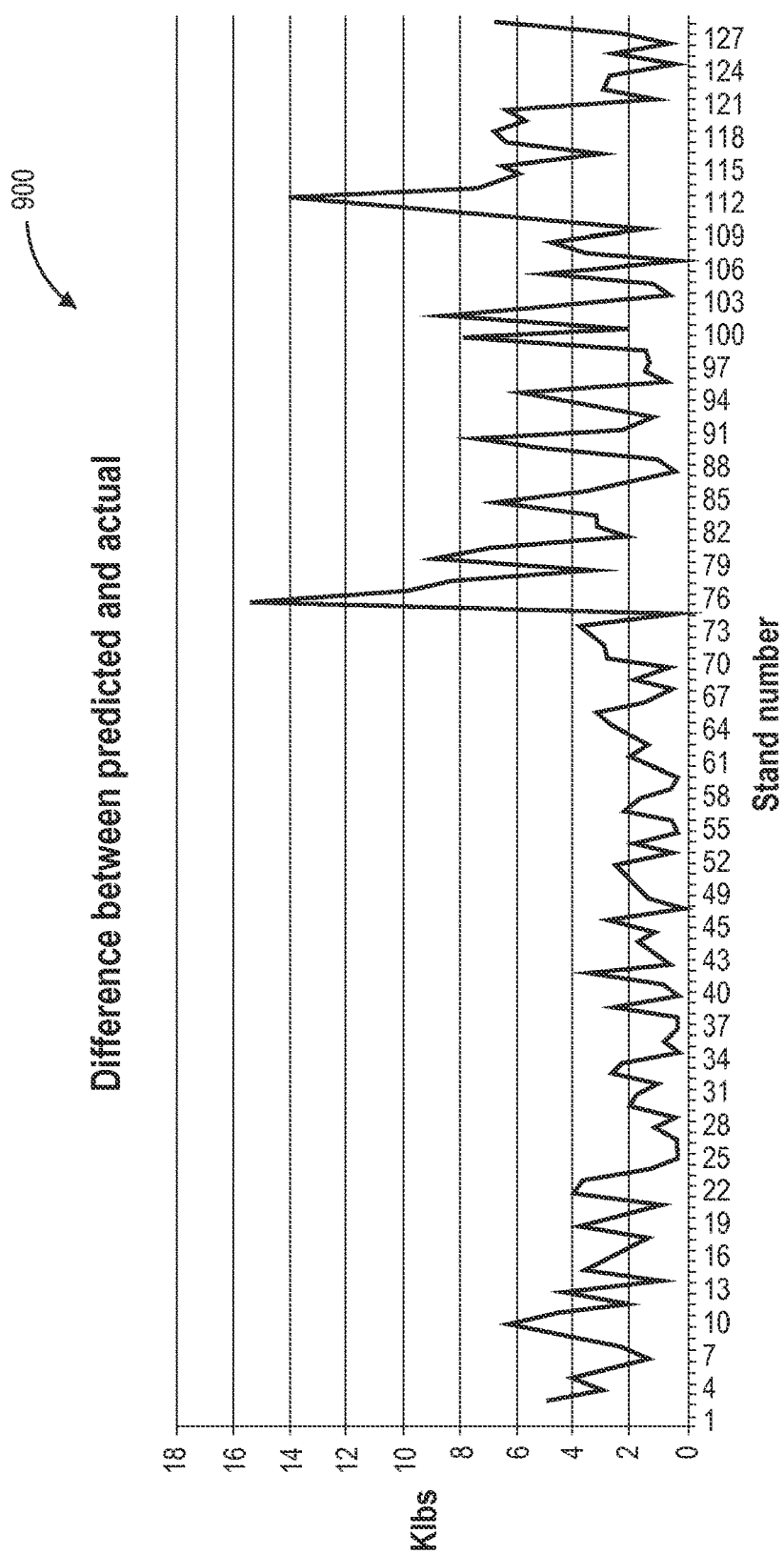
FIG. 9 is a graph depicting a difference between actual values and predicted values per stand of a well-drilling apparatus in accordance with an example embodiment of the present disclosure.
Figure 10:
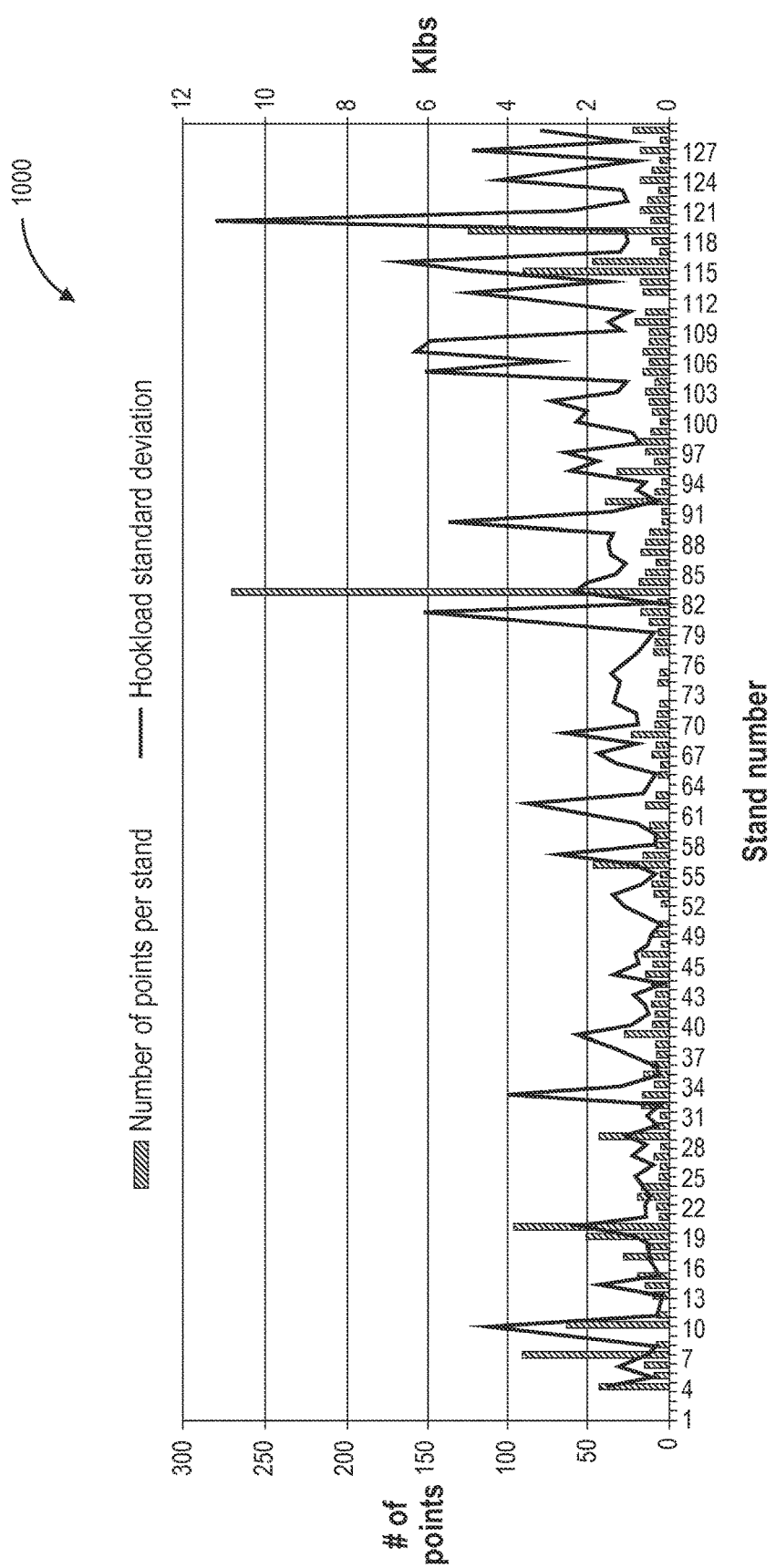
FIG. 10 is a graph depicting a standard deviation and a number of points per stand for a hookload value in accordance with an example embodiment of the present disclosure.

As shown in FIG. 8, a quality indicator is applied to the difference of the projected value and the computed value within a particular section (Block 806). The calibration module 121 can instruct the processor 116 to apply a quality indicator, such as a measurement of the standard deviation, to the difference between the projected value and the corresponding computed value. A calibration quality is determined based upon the application of the quality indicator (Block 808). For example, the processor 116 determines a calibration quality per stand based upon the application of the quality indicator to the difference value. For instance, a low standard deviation may be defined as a standard deviation value of between zero (0) standard deviations and one and a half (1.5) standard deviations (e.g., may indicate the projected values approximate the computed values). For example, a standard deviation from about 0, 0.1, 0.2, 0.3, 0.4, 0.5, 0.6, 0.7, 0.8, 0.9, 1.0, 1.1, 1.2, 1.3, 1.4, 1.5 to about 0, 0.1, 0.2, 0.3, 0.4, 0.5, 0.6, 0.7, 0.8, 0.9, 1.0, 1.1, 1.2, 1.3, 1.4, 1.5 may be defined as a low standard deviation. In another instance, a high standard deviation may be defined as a standard deviation value of greater than three (3) standard deviations (e.g., may indicate that the projected values do not approximate the computed values). For example, a standard deviation greater than 3.0, greater than 3.1, greater than 3.2, greater than 3.3, greater than 3.4, greater than 3.5, greater than 3.6, greater than 3.7, greater than 3.8, greater than 3.9, greater than 4.0, greater than 4.1, greater than 4.2, greater than 4.3, greater than 4.4, greater than 4.5, greater than 4.6, greater than 4.7, greater than 4.8, greater than 4.9, or greater than 5.0 may be defined as a high standard deviation. FIG. 9 depicts an illustrative graph 900 representing a difference between actual and predicted values per stand. FIG. 10 depicts an illustrative graph 1000 representing a standard deviation and a number of points per stand (e.g., quality indicators) for a hookload value. The metric of number of points measured per stand may provide a measure of how well the calibration is being implemented within the well-drilling apparatus 100.

The calibration values may be utilized by rig site personnel to evaluate the condition of the well-drilling apparatus 100. Additionally, the computing device 114 may transmit notifications to remote personnel indicating an issue with the well-drilling apparatus 100. For example, as shown in FIG. 2, the computing device 114 includes an alert module 138, which is storable in the memory 118 and executable by the processor 116. The alert module 138 represents functionality that issues alert notifications when a calibration value exceeds a predefined threshold. Additionally, the calibration values may be utilized for (1) automatic calibration of downhole measurements of torque, weight on bit, and/or differential pressure; (2) incorporating a torque and drag model to detect and compensate for sticking events during the calibration procedures; and/or (3) incorporating cutting transport models to detect and confirm events (e.g., sticking events) during the calibration process.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the instance of a hardware embodiment, for instance, the various blocks discussed in the above disclosure may be implemented as integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software embodiment, for instance, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although only a few example embodiments have been described in detail above, those skilled in the art will readily appreciate that many modifications are possible in the example embodiments without materially departing from "Calibrations For A Well Drilling Apparatus." Accordingly, one or more of the modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A computing device comprising:
 a memory to store one or more modules;
 a processor operably coupled to the memory, the processor to execute the one or more modules to:
 calculate a projected value and a calculated value based upon a data set of measurements made by at least one formation evaluation or drilling parameter instrument in the wellbore corresponding to at least one time interval section associated with a rig state of a well-drilling apparatus;
 wherein the executed module accepts as input data corresponding to measured parameters associated with at least one intentional set of actions on the well-drilling apparatus (a rig state) from the well-drilling apparatus and calculates the rig state based on the input data;
 the executed module filters the input data to determine when there are sufficient measurements corresponding to the calculated rig state to determine the calculated value (316), and to determine the projected value when there are insufficient measurements (322) corresponding to the calculated rig state;
 calculate a difference between the projected value and the calculated value;
 apply a quality indicator to the difference between the projected value and the calculated value;
 determine a calibration quality based upon the application of the quality indicator to the difference; and
 wherein the processor executes the one or more modules to issue an alert notification when the calibration quality exceeds a predefined threshold, and communicates the predicted value to wellsite personnel to enable continued drilling of a well; and
 applies the calibration quality to the difference to determine a calibration value, the calibration value used to at least one of,
 (1) automatically calibrating downhole measurements of torque, weight on bit, and/or differential pressure;
 (2) incorporating a torque and drag model to detect and compensate for sticking events during the calibration procedures; and
 (3) incorporating cutting transport models to detect and confirm pipe sticking events during the calibration process.

2. The computing device as recited in claim 1, wherein the processor executes the one or more modules to receive one or more data sets corresponding to the time interval section associated with the rig state of the well-drilling apparatus.

3. The computing device as recited in claim 1, wherein the quality indicator comprises a standard deviation.

4. The computing device as recited in claim 1, wherein the projected value comprises at least one of a projected hookload value, a projected off bottom torque loss value, or a projected off bottom pressure value.

5. The computing device as recited in claim 4, wherein the computed value comprises at least one of a computed hookload value, a computed off bottom torque loss value, or a computed off bottom pressure value.

6. The computing device as recited in claim 1, wherein the processor executes the one or more modules to apply at least one rig state filter to the data set; determine whether there is a sufficient data within the filtered data set; calculate the projected value when there is insufficient data within the filtered data set; and calculate the calculated value when there is sufficient data within the filtered data set.

7. A method comprising:
accepting as input to a processor input data corresponding to measured parameters associated with at least one intentional set of actions on the well-drilling apparatus (a rig state) from a well drilling apparatus;
in the processor, calculating a rig state based on the input data, wherein the calculating a rig state comprises in the processor, filtering the input data to determine when there are sufficient measurements corresponding to the calculated rig state to determine a calculated value, and to determine a projected value when there are insufficient measurements corresponding to the calculated rig state;
calculating, by way of the processor, the projected value and the calculated value based upon a data set of measurements made by at least one formation evaluation or drilling parameter instrument in the wellbore corresponding to at least one time interval section associated with the calculated rig state;
calculating a difference between the projected value and the calculated value;
applying a quality indicator to the difference between the projected value and the calculated value;
determining a calibration quality based upon the application of the quality indicator to the difference;
issuing an alert notification when the calibration quality exceeds a predefined threshold; and
using the projected value to continue drilling a wellbore; and
applying the calibration quality to the difference to determine a calibration value, the calibration value used to at least one of,
(1) automatically calibrating downhole measurements of torque, weight on bit, and/or differential pressure;
(2) incorporating a torque and drag model to detect and compensate for sticking events during the calibration procedures; and
(3) incorporating cutting transport models to detect and confirm pipe sticking events during the calibration process.

8. The method as recited in claim 7, wherein the processor executes one or more modules to receive one or more data sets corresponding to the time interval section associated with the rig state.

9. The method as recited in claim 7, wherein the quality indicator comprises a standard deviation.

10. The method as recited in claim 7, wherein the projected value comprises at least one of a projected hookload value, a projected off bottom torque loss value, or a projected off bottom pressure value.

11. The method as recited in claim 10, wherein the computed value comprises at least one of a computed hookload value, a computed off bottom torque loss value, or a computed off bottom pressure value.

12. The method as recited in claim 7, wherein the filtering comprises applying at least one rig state filter to the data set; determining whether there is a sufficient data within the rig-state filtered data set; calculating the projected value when there is insufficient data within the rig-state filtered data set; and calculating the calculated value when there is sufficient data within the rig-state filtered data set.

13. A system comprising:
a well-drilling apparatus, the well-drilling apparatus including a well logging tool for measuring one or more characteristics associated with a section of the well-drilling apparatus; and
a computing device communicatively coupled to the well logging tool, the computing device comprising;
a memory to store one or more modules;
a processor operably coupled to the memory, the processor to execute the one or more modules to;
calculate a projected value and a calculated value based upon a data set of measurements made by at least one formation evaluation or drilling parameter instrument associated with the well logging tool corresponding to at least one time interval section associated with a rig state of the well-drilling apparatus;
calculate a difference between the projected value and the calculated value;
apply a quality indicator to the difference between the projected value and the calculated value; and
determine a calibration quality based upon the application of the quality indicator to the difference, characterized by the processor, accepting as input to a processor input data corresponding to measured parameters associated with at least one intentional set of actions on the well-drilling apparatus (a rig state) from a well drilling apparatus;
calculating a rig state based on the input data, wherein filtering the input data to determine when there are sufficient measurements corresponding to the calculated rig state to determine a calculated value, and to determine a projected value when there are insufficient measurements corresponding to the calculated rig state;
issuing an alert notification when the calibration quality exceeds a predefined threshold; and
using the projected value as input to direct the well drilling apparatus to continue drilling a wellbore; and
applying the calibration quality to the difference to determine a calibration value, the calibration value used to at least one of,
(1) automatically calibrating downhole measurements of torque, weight on bit, and/or differential pressure;
(2) incorporating a torque and drag model to detect and compensate for sticking events during the calibration procedures; and
(3) incorporating cutting transport models to detect and confirm pipe sticking events during the calibration process.

14. The system as recited in claim 13, wherein the processor executes the one or more modules to receive one or more data sets corresponding to the section associated with an well-drilling apparatus.

15. The system as recited in claim 13, wherein the quality indicator comprises a standard deviation.

16. The system as recited in claim 13, wherein the projected value comprises at least one of a projected hookload value, a projected off bottom torque loss value, or a projected off bottom pressure value.

17. The system as recited in claim 16, wherein the computed value comprises at least one of a computed hookload value, a computed off bottom torque loss value, or a computed off bottom pressure value.

18. The system as recited in claim 13, wherein the processor executes the one or more modules to apply at least one rig state filter to the data set; determine whether there is a sufficient data within the filtered data set; calculate the projected value when there is insufficient data within the filtered data set; and calculate the calculated value when there is sufficient data within the filtered data set.

19. The system as recited in claim 13, wherein the processor executes the one or more modules to issue an alert notification when the calibration quality exceeds a predefined threshold.

\* \* \* \* \*